(12) United States Patent
Maeda

(10) Patent No.: US 7,136,784 B2
(45) Date of Patent: Nov. 14, 2006

(54) METHOD OF EVALUATING REFLECTION PERFORMANCE OF REFLECTING MIRROR, EVALUATION SYSTEM FOR EVALUATING REFLECTION PERFORMANCE OF REFLECTING MIRROR, AND COMPUTER-READABLE STORAGE MEDIUM STORING PROGRAM FOR EVALUATING REFLECTION PERFORMANCE OF REFLECTING MIRROR

(75) Inventor: Masahiro Maeda, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 692 days.

(21) Appl. No.: 09/765,639

(22) Filed: Jan. 22, 2001

(65) Prior Publication Data

US 2001/0010033 A1 Jul. 26, 2001

(30) Foreign Application Priority Data

Jan. 20, 2000 (JP) ............................ P2000-012054

(51) Int. Cl.
*G06F 17/50* (2006.01)
(52) U.S. Cl. .................. 703/1; 703/6; 703/7; 703/8; 362/459; 362/487; 362/507; 362/518; 362/520
(58) Field of Classification Search ............... 703/1, 703/6, 7, 8; 362/459, 487, 507, 518, 520
See application file for complete search history.

(56) References Cited

U.S. PATENT DOCUMENTS

| | | | |
|---|---|---|---|
| 4,481,563 A | 11/1984 | Snyder et al. | 362/296 |
| 4,495,552 A | 1/1985 | Graff | 362/297 |
| 4,959,757 A | 9/1990 | Nakata | 362/61 |
| 5,065,287 A | 11/1991 | Staiger et al. | 362/61 |
| 5,655,828 A | 8/1997 | Yamamoto et al. | 362/61 |
| 5,675,495 A * | 10/1997 | Biermann et al. | 700/97 |
| 5,707,141 A | 1/1998 | Yamamoto et al. | 632/305 |
| 5,836,668 A * | 11/1998 | Ishikawa et al. | 362/459 |

FOREIGN PATENT DOCUMENTS

JP 9-33708 2/1997

OTHER PUBLICATIONS

Breault Research Organization, "Press Release Archive" Jul. 1998-Apr. 2001.*
BRO, "ReflectorCAD User's Guide", Breault Research Organization, 1999, pp. 1-87.*
Patent Abstracts of Japan 09033708 Feb. 7, 1997.

* cited by examiner

*Primary Examiner*—Kamini Shah
*Assistant Examiner*—Herng-der Day
(74) *Attorney, Agent, or Firm*—Sughrue Mion, PLLC

(57) ABSTRACT

There are provided a method of evaluating the reflection performance of a reflecting mirror designed for a vehicle lamp, an evaluation system, and a computer-readable storage medium. There are provided steps (108*a*) and (108*b*) in the method. The step (108*a*) is provided so as to enter design information representative of a plurality of reflecting basic surfaces as well as position information of a light source in a vehicle lamp. The step (108*b*) is provided so as to display attribute information with respect to each of a plurality of areas into which one reflecting basic surface selected from among the reflecting basic surfaces is divided on the basis of design information. The attribute information indicates whether imaginary light from the light source position can effectively reach each area, and is applied to a reflecting mirror composed of the plurality of reflecting basic surfaces.

14 Claims, 12 Drawing Sheets ary lamp, an evaluation system for evaluating the reflection performance of a reflecting mirror designed for a vehicle lamp, and a computer-readable storage medium storing a program for evaluating the reflection performance of a reflecting mirror designed for a vehicle lamp.

METHOD OF EVALUATING REFLECTION PERFORMANCE OF REFLECTING MIRROR, EVALUATION SYSTEM FOR EVALUATING REFLECTION PERFORMANCE OF REFLECTING MIRROR, AND COMPUTER-READABLE STORAGE MEDIUM STORING PROGRAM FOR EVALUATING REFLECTION PERFORMANCE OF REFLECTING MIRROR

BACKGROUND OF THE INVENTION

1. Field of the Invention

The present invention relates to a method of evaluating the reflection performance of a reflecting mirror designed for a vehicle lamp, an evaluation system for evaluating the reflection performance of a reflecting mirror designed for a vehicle lamp, and a computer-readable storage medium storing a program for evaluating the reflection performance of a reflecting mirror designed for a vehicle lamp.

2. Related Background Art

A vehicle lamp comprises a light source, a reflecting mirror for obtaining approximately parallel light from this light source, and a lens disposed in front of the reflecting mirror.

In recent years, to the outside shapes of vehicles incorporating this type of vehicle lamps, various shapes have been applied in order to make the appearance of the vehicles more attractive. For this purpose, the outside shapes of the vehicles and shape-related restrictions, such as accommodating spaces for the vehicle lamps to be built in the vehicles are required for the vehicle lamps, i.e., the vehicle lamps, can be arranged in predetermined spaces with the desired appearance of the vehicles made attractive.

Therefore, in the development of the vehicle lamps, it is necessary to determine the shape of the reflecting mirrors while taking these requirements into account. Thus, the reflecting mirrors of the vehicle lamps have been adopting reflecting surfaces, such as paraboloids of revolution or multiple paraboloids, in order to obtain the desired reflection performance.

SUMMARY OF THE INVENTION

These lamps have recently been required to have both the desired outside shape and predetermined reflection performance superior to conventional reflection performance. The present inventors have studied the design of the reflecting mirrors and then have found the following problems that occur when reflecting mirrors are provided so as to satisfy requirements from both the performance of the vehicle lamps and the appearance of the vehicles.

In the actual design of reflecting mirrors, vehicle makers provides lamp makers with shape restriction conditions and reflection performance in almost all cases. The reflection performance of the vehicle lamps is characterized in that it is difficult to quantitatively evaluate it, as compared with the shape restriction conditions. In this case, there may be a trade-off between the requirements from the shape restriction conditions and the reflection performance. Therefore, what is desired is to make preliminary evaluation of the reflection performance in an early stage of the design of the reflecting mirror. Further, it is desirable that the evaluation of the reflection performance has at least desired degree of accuracy applicable to design requirements for reflecting mirrors that may occur in the future.

A reflecting mirror for a vehicle lamp has a plurality of reflecting surfaces. Each of these reflecting surfaces is arranged on the basic curved surface that defines the relative arrangement of each reflecting surface. In addition, each individual reflecting surface is arranged on the basic curved surface so as to satisfy the relative positional relationship between a light source and this reflecting surface. In the reflecting mirror obtained from such design, it has been thought that when incident light from the light source is reflected in the optical-axial direction by the reflecting surface. Therefore, it has been expected that the individual reflecting surfaces uniformly reflect light in the thus-designed reflecting mirror, as observed in the optical-axial direction.

However, when the reflection performance of a real reflecting mirror was examined, the amount of reflected light from each individual reflecting surface is different from one another. The inventors have discovered that the uniformity of reflection is not necessarily achieved all over the reflecting surfaces.

A further investigation on this fact showed that one reflecting surface interferes with incident light to other reflecting surfaces, so that all areas of each individual reflecting surface cannot reflect incident light. In addition, since accommodations for different vehicle lamps have different shapes, a basic curved surface, i.e., an underlying surface on which the respective reflecting surfaces are arranged, is also different from one another. Thus, even with careful designs based on the experiences of skilled designers, it is not easy to avoid interference between reflecting surfaces at the design stage of determination of the basic curved surface and at the design stage of the arrangement of the individual reflecting surfaces. That is to say, what is desired is to evaluate such reflection performance at a predetermined design stage.

It is, therefore, an object of the present invention to provide a method of evaluating the reflection performance of a reflecting mirror designed for a vehicle lamp, an evaluation system for evaluating the reflection performance of a reflecting mirror designed for a vehicle lamp, and a computer-readable storage medium storing a program for evaluating the reflection performance of a reflecting mirror designed for a vehicle lamp.

To achieve this object, the present invention has been made. As will be described below, the present invention has several aspects: a method of evaluating reflection performance; and an evaluation system; a storage medium storing a program.

The present invention relates to a method of evaluating the reflection performance of a reflecting mirror designed for a vehicle lamp. This method is applicable to a reflecting mirror composed of a plurality of reflecting basic surfaces. This method comprises the steps of: (a) entering design information and position information, design information being representative of a plurality of reflecting basic surfaces, and position information being representative of the position of a light source in the vehicle lamp; and (b) displaying attribute information with respect to a plurality of areas, respectively. The plurality of areas are obtained by dividing one reflecting basic surface selected from the reflecting basic surfaces according to the design information. The attribute information includes an attribute indicative of whether imaginary light from the position of the light source, defined by the position information on the light source position, can effectively reach each area.

A storage medium according to the present invention stores a program for executing the following entering process and a first display process. This program enables a computer to execute evaluation of the reflection performance of a reflecting mirror designed for a vehicle lamp. In the entering process, design information and position information are entered. The design information represents the plurality of reflecting basic surfaces that constitute the reflecting mirror. The position information represents the position of a light source in the vehicle lamp. In the first display process, the attribute information is displayed.

An evaluation system for evaluating reflection performance of a reflecting mirror according to the present invention comprises: (1) a memory; (2) a display device that displays received information; (3) input means for entering design information and position information of a light source to storing the entered information in the memory; and (4) first transmitting means for transmitting attribute information to the display device. The design information indicates a plurality of reflecting basic surfaces that constitute the reflecting mirror. The position information includes data concerning the position of the light source contained in the vehicle lamp. The attribute information indicates whether imaginary light from the position of the light source, defined by the position information of the light source, can effectively reach a plurality of areas, respectively. Into the plurality of areas, one reflecting basic surface selected from the reflecting basic surfaces is divided on the basis of the design information.

The attribute information is displayed for each area. This displayed image provides each of the areas, smaller than the reflecting basic surface, with the respective attributes. For example, one attribute assigned an area of the basic reflecting surface indicates that light from the light source effectively reaches this area without being intercepted by another reflecting basic surface. Accordingly, this attribute represents that the area looks bright. In addition, another attribute assigned to an area of the basic reflecting surface indicates that light from the light source does not reach this area because another reflecting basic surface intercepts the light. This attribute represents that the area looks dark. Accordingly, these attributes indicate optical aspects, such as the reflection performance, of each individual basic reflecting surface. When the attribute information is displayed, the reflection performance of the reflecting surface can be visibly recognized.

In the evaluation system, the design information and the position information can be stored in a memory. The attribute information, obtained from the design information and position information, is transmitted to the display device, whereby the display device can visualize the attribute information thereon. In this manner, it is possible to visibly recognize whether light from the light source position can effectively reach the respective areas of the basic reflecting surface.

A method of evaluating the reflection performance of a reflecting mirror according to the present invention, further comprises the step of: (c) displaying attribute information concerning respective attributes for the plurality of areas that each of the remaining reflecting basic surface has.

The storage medium according to the present invention further includes a program for executing the additional process as follows. This program further has a second display process in which attribute information on the attribute is displayed.

The evaluation system for evaluating reflection performance of the reflecting mirror according to the present invention further comprises: (5) second transmitting means for transmitting attribute information concerning a predetermined attribute to the display device.

Accordingly, for the remaining of the plurality of reflecting basic surfaces, the reflection performance of the reflecting mirror can be evaluated on the basis of the displayed attribute information. Accordingly, in all of the reflecting basic surfaces that constitute the reflecting mirror, attribute information is displayed for each area of each of the reflecting basic surfaces. That is to say, since reflection performance is evaluated for all the reflecting basic surfaces, optical aspects of the entire reflecting basic surface can be understood.

In the method of evaluating the reflection performance of reflecting mirror according to the present invention, attribute information to be displayed can be generated by the following steps. This method further comprises the steps of: (d) generating divided area information, the divided area information including data on the plurality of areas into which one reflecting basic surface selected from the reflecting basic surfaces is divided on the basis of the design information, the divided area information being associated with design information; (e) making determination, on the basis of the divided area information and the design information, as to whether imaginary light from the light source position can effectively reach each area of the one reflecting basic surface; and (f) generating, on the basis of the determination, attribute information on the attribute of each area of the selected reflecting basic surface. The attribute information is associated with at least one of the design information and the divided area information.

The storage medium according to the present invention stores the program for executing the further process. This program has a first division process, a first determination process and a first attribute process. The first division process generates divided area information so as to be associated with the design information, and the divided area information includes data on the plurality of areas into which one reflecting basic surface selected from the reflecting basic surfaces is divided on the basis of the design information. The first determination process makes determination, on the basis of the divided area information and the design information, as to whether imaginary light from the light source position defined by the position information can effectively reach each area of the selected reflecting basic surface. The first attribute process generates, on the basis of the determination, attribute information on the attribute to each area. The attribute information is associated with at least one of the design information and the divided area information.

The evaluation system for evaluating the reflection performance of the reflecting mirror according to the present invention further comprises: (6) first division means for generating divided area information so as to be associated with design information. The divided area information includes data on a plurality of areas into which one reflecting basic surface selected from the reflecting basic surfaces is divided on the basis of the design information; (7) first determination means for making determination, on the basis of the divided area information and the design information, as to whether imaginary light from the light source position, defined by the position information of the light source, can effectively reach each area of the selected reflecting basic surface; and (8) first attribute means for generating, in response to the determination, attribute information on the attribute of the plurality of areas, the attribute information being associated with at least one of the design information and the divided area information.

Determination is made on the basis of the design information and the divided area information generated so as to be associated with the design information. On the basis of the determination, the attribute information is generated so as to be associated with at least one of the design information and the divided area information. Accordingly, it is possible to display the attribute information in association with at least one of the design information and the divided area information.

The method of evaluating the reflection performance of the reflecting mirror according to the present invention further comprises the steps of: (g) repeatedly applying step (d) to one reflecting basic surface sequentially selected from the remaining ones of the reflecting basic surfaces to update the divided area information, the divided area information being associated with the design information; (h) repeatedly applying steps (e) and (t) to one reflecting basic surface sequentially selected from the remaining ones of the reflecting basic surfaces to update the attribute information, the attribute information being associated with at least one of the design information and the divided area information; and (i) displaying attribute information concerning the attributes with respect to a plurality of areas into which each of the remaining ones of the reflecting basic surfaces is divided on the basis of the design information.

The storage medium according to the present invention stores a program for executing the further process. This program has a second division process, a second determination process, a second attribute process and a third transmitting process. The second division process generates divided area information so as to be associated with the design information, and the divided area information includes data on a plurality of areas into which each reflecting basic surfaces is divided on the basis of the design information. The second determination process makes determination, on the basis of the divided area information and the design information, as to whether imaginary light from the light source position, defined by the position information of the light source, can effectively reach each area of the respective reflecting basic surfaces. The second attribute process can generate, on the basis of the determination, attribute information concerning the attributes of the areas of the reflecting basic surfaces, the attribute information being associated with at least one of the design information and the divided area information. The third display process displays attribute information concerning the attributes with respect to the areas of each of the remaining ones of the reflecting basic surfaces. Each of the remaining reflecting basic surfaces is divided into a plurality of areas on the basis of the design information.

The evaluation system for evaluating the reflection performance of the reflecting mirror according to the present invention further comprises: (9) second division means for generating, on the basis of the design information, divided area information, the divided area information being associated with design information, the divided area information including data on a plurality of areas into which each reflecting basic surfaces is divided; (10) second determination means for making determination, on the basis of the divided area information and the design information, as to whether imaginary light from the light source position can effectively reach the areas of the reflecting basic surfaces, respectively; (11) second attribute means for generating, on the basis of the determination, attribute information concerning the attributes of the areas of the reflecting basic surfaces, the attribute information being associated with at least one of the design information and the divided area information; and (12) third transmitting means for transmitting, to the display device, the attribute information concerning the attributes of the areas of each of the remaining ones of the reflecting basic surfaces, respectively, each of the remaining reflecting basic surfaces being divided into the areas on the basis of the design information.

Accordingly, each of the reflecting basic surfaces is divided into the plurality of areas for all the reflecting surfaces that constitute the reflecting mirror, and the attribute information is determined for each of the areas. Specifically, the attribute information, generated for evaluating reflection performance with respect to all the reflecting basic surfaces, provides the whole reflecting mirror with the optical evaluation.

In the method of evaluating the reflection performance of the reflecting mirror according to the present invention, the step (c) includes the steps of: (c1) providing each of the areas with an evaluation point; (c2) generating a straight line, the straight line passing through the evaluation point and the light source position; and (c3) determining whether the straight line intersects a reflecting basic surface other than the reflecting basic surface that is associated with the areas.

The storage medium according to the present invention stores the program for executing further processes. In this program, the second determination process can include the processes of: (i) providing each of the areas with an evaluation point; (ii) generating a straight line passing through the evaluation point and the light source position; and (iii) determining whether the straight line intersects a reflecting basic surface other than the reflecting basic surface that is associated with the areas.

In the evaluation system for evaluating the reflection performance of the reflecting mirror according to the present invention, each of the first and second determination means can include: means for selecting an evaluation point for each of the areas; means for generating a straight line that connects the evaluation point to the light source position; and means for determining whether the straight line intersects a reflecting basic surface other than the reflecting basic surface which corresponds to the areas.

Light traveling from the light source to a reflecting surface can be associated with a line segment (the portion of a straight line between both points below) which connects an evaluation point, determined with respect to each of the areas, with the point of the light source. Thus, it is determined whether this line segment intercepts another reflecting basic surface.

In the inventions described above, each area can be a polygon.

A method of designing a reflecting mirror for a vehicle lamp according to the present invention includes the steps of: (1) generating, on the basis of predetermined conditions, reflecting basic surfaces which constitute the reflecting surface; (2) dividing each of the reflecting basic surfaces into a plurality of areas; and (3) making determination as to whether imaginary light from a light source position, defined by the position information of the light source, can effectively reach the areas of each of the reflecting basic surfaces, respectively. The predetermined conditions include shape restriction conditions and the position condition. The shape restriction conditions define a accommodation for the reflecting mirror, and the position condition defines the position of the light source included in the vehicle lamp. Since attribute information is determined for each area of the basic reflecting surface, the attribute information can be recognized for each area smaller than the reflecting basic surface.

The method of designing a reflecting mirror for a vehicle lamp according to the present invention further includes (4) displaying, in response to the determination made in step (3), a first attribute on the areas that the imaginary light can effectively reach, and a second attribute on the other areas that imaginary light from a light source position does not reach.

The attributes are visualized by being displayed. Accordingly, it is possible to visibly estimate, over the entire reflecting mirror, whether light from the light source position can effectively reach each area.

The first attribute indicates that light from the light source effectively reaches areas of the basic reflecting surface without being intercepted by another reflecting basic surface. Accordingly, in the areas indicated by this attribute, light from the light source reaches and is reflected. The second attribute indicates that light from the light source is blocked by another reflecting basic surface. Accordingly, in the areas indicated by this attribute, light from the light source does not reach the areas of the basic reflecting surface. Therefore, these attributes allow the evaluation of the reflection performance for each individual reflecting basic surface.

The method of designing a reflecting mirror for a vehicle lamp according to the present invention further include the steps of (5) executing the above-described steps (1) to (3) when it is determined, in response to the first and second attributes displayed in step (4), that the reflecting basic surfaces are inappropriate for the vehicle lamp; and (6) adopting the reflecting basic surfaces, in step (1), for the reflecting mirror when it is determined, on the basis of the first and second attributes displayed in step (4), that reflecting basic surfaces are appropriate for the vehicle lamp.

BRIEF DESCRIPTION OF THE DRAWINGS

The above and other objects, features, and advantages of the present invention will become readily apparent from the following detailed description of the preferred embodiments of the present invention which will be given with reference to the accompanying drawings.

DESCRIPTION OF THE PREFERRED EMBODIMENTS

A preferred embodiment of the present invention will be described in detail in conjunction with the drawings. Identical or like portions will be denoted by the same reference symbols and redundant description will be omitted.

Figure 1:
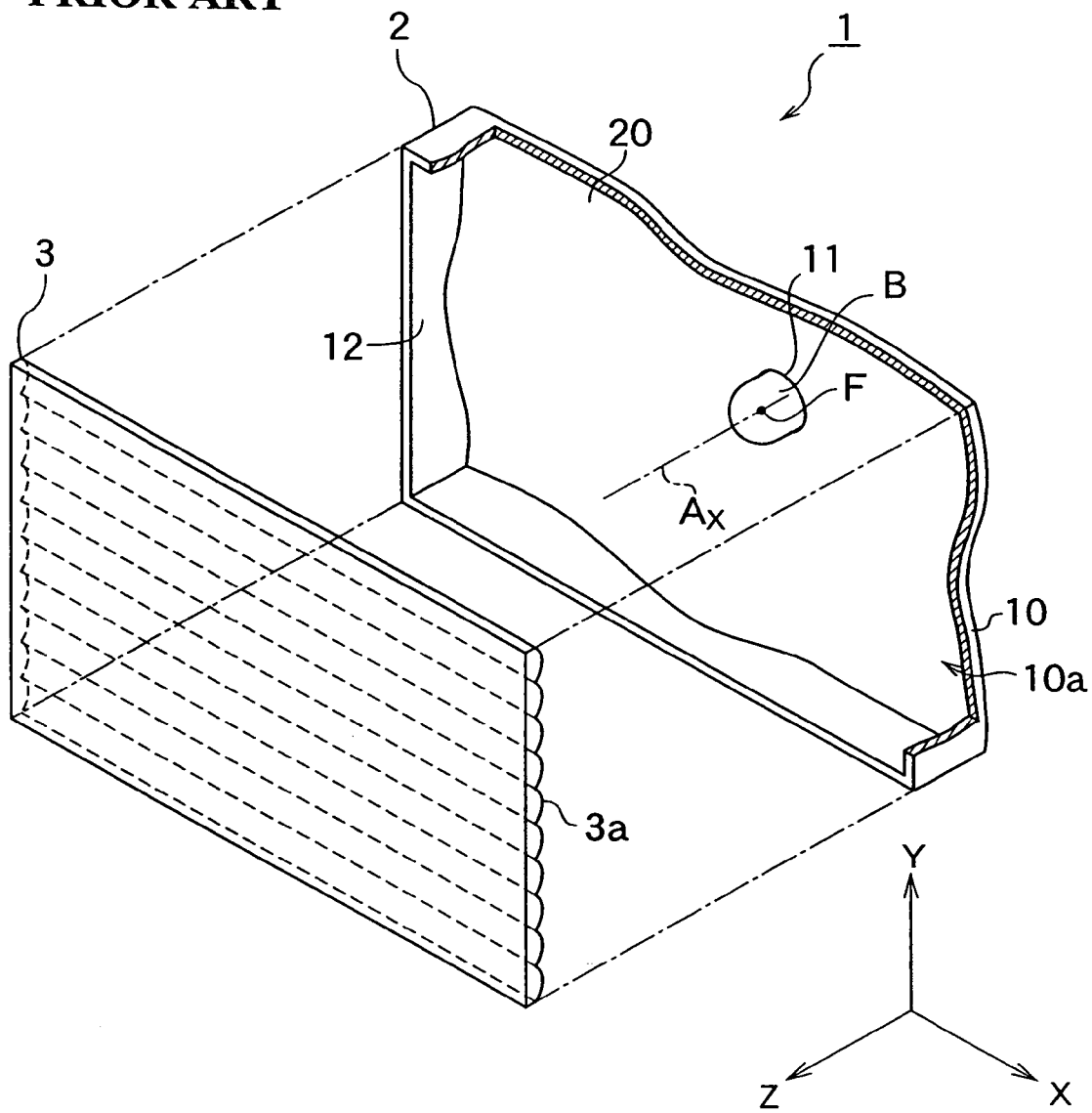
FIG. 1 is a perspective view, partially broken away, showing a vehicle lamp according to one embodiment of the present invention.
Figure 2:
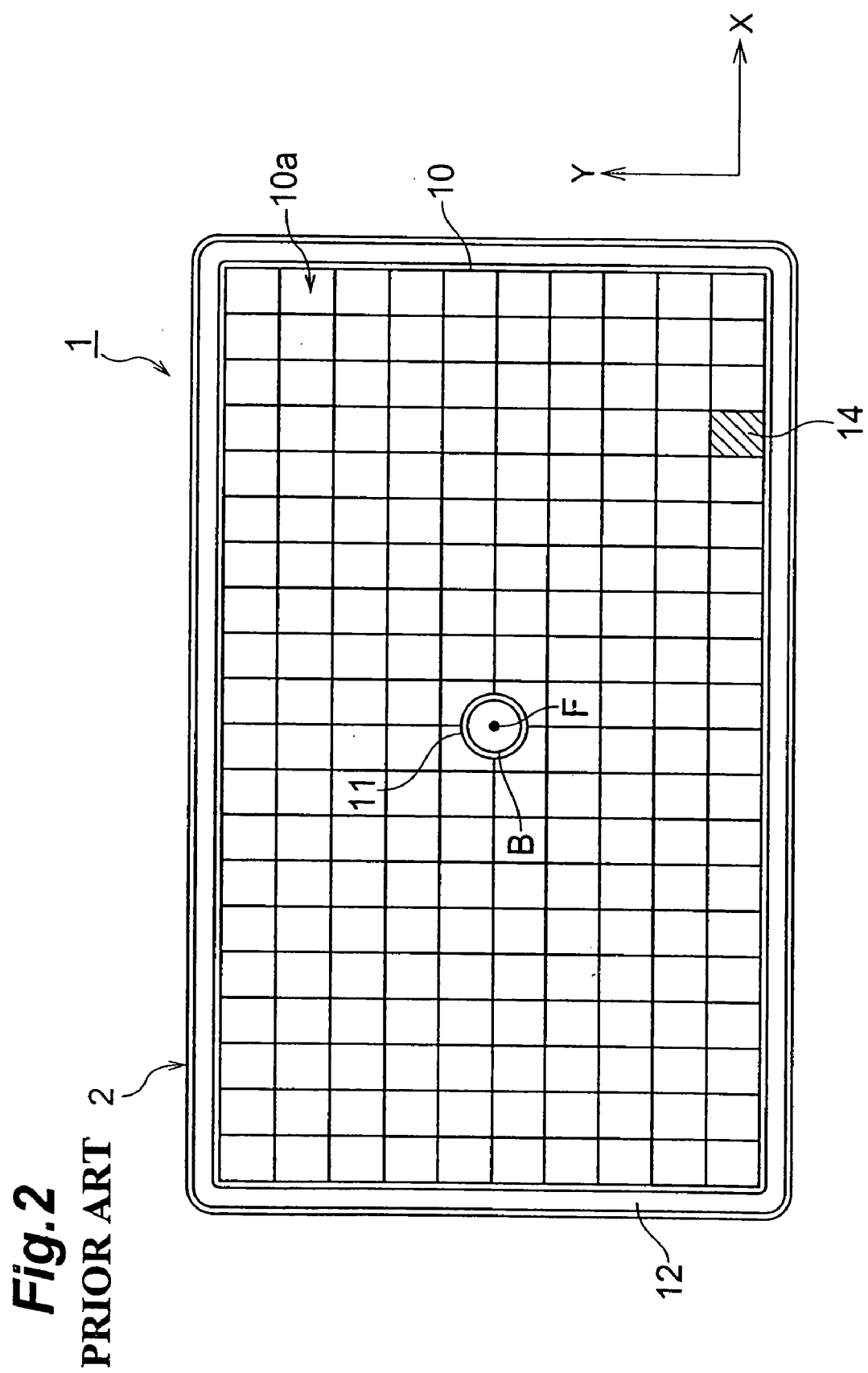
FIG. 2 is a plan view showing the reflecting surface of the reflecting mirror shown in FIG. 1.

FIG. 1 is a perspective view showing a vehicle lamp comprising a reflecting mirror according to the present embodiment. In FIG. 1, there are not shown members for securing and positioning the reflecting mirror and a lens, but those skilled in the art could add these members to the lamp of FIG. 1. FIG. 2 is a plan view showing the reflecting mirror of the vehicle lamp of FIG. 1, and the lens in the vehicle lamp is omitted. There is an XYZ coordinate system in each of FIGS. 1 and 2. In the coordinate system, the Z-axis is oriented in the direction of an optical axis Ax, and the X- and Y-axes are contained in a plane perpendicular to the Z-axis.

Referring to FIG. 1, a vehicle lamp 1 of the present embodiment comprises a reflecting mirror 2 and a lens 3. The vehicle lamp 1 can be used as an indicator lamp, such as a tail lamp for an automobile, which is not, however, limited thereto.

FIG. 1 does not show a structure of a reflecting surface 10a in detail, but schematically shows the basic curved surface of the reflecting surface 10a, specifically, a free formed surface 20. The basic curved surface defines a base shape, for example, a shape of the reflecting surface 10a, to form the foundation of the reflecting mirror. In the present embodiment, a paraboloid of revolution is not used as the base shape, and the free formed surface 20, which satisfies predetermined conditions such as shape restriction conditions, is chosen.

The reflecting mirror 2 extends above a plane intersecting the optical axis Ax, for example, a plane approximately perpendicular to the optical axis Ax. The optical axis Ax defines the direction that the light is provided. The lens 3 is provided so as to intersect the optical axis Ax at a predetermined angle, for example, at the right angle. The reflecting mirror 2, in general, has an outside shape determined on the basis of the shape restriction conditions. In the present embodiment, the reflecting mirror 2 has an approximately rectangular outside shape, as seen from the direction of the Z-axis. The reflecting mirror 2 has a reflecting mirror portion 10 and an external frame portion 12. The reflecting mirror portion 10 has the reflecting surface 10a disposed so as to be opposed to the lens 3, and the reflecting surface 10a can reflect light from a light source point F in the optical-axial direction. The external frame portion 12 is a tubular member extending from the periphery of the reflecting mirror portion 10a, and serves to position and secure the lens 3 with respect to the reflecting mirror 2. A hole 11 is provided at a predetermined position of the reflecting surface 10a, for example, at a position where the optical axis Ax intersects the reflecting surface 10a. A light source bulb B is inserted through the hole 11 into a space provided between the lens 3 and the reflecting mirror 2. The light bulb B is secured to the reflecting mirror 2 such that the light source point F is positioned at a predetermined position, i.e., light source position, on the optical axis Ax.

In the present embodiment, FIG. 1 shows, by way of example, the peripheral shape of the reflecting mirror 2 (for example, the outside shape of the frame portion 12), the installation angle of the lens 3 with respect to the optical axis Ax, and the position of the light bulb B. In individual specific cases, the form of the vehicle lamp can be provided in view of the conditions required by the design condition of a vehicle body, such as the shape restriction condition. Accordingly, the shape restriction condition defines, for example, not only the volume and shape of the light accommodation in the vehicle body but also the outside shape of a lamp, i.e., the outside shape of the lens in many cases, which is incorporated in the vehicle body. A specific method for manufacturing the reflecting surface 10a of the reflecting mirror 2 is not particularly limited to the present embodiment, and various manufacturing methods can be applied. In general, the subsequent description can be applied to lamps having reflecting mirrors.

FIG. 2 shows the reflecting surface 10a. The reflecting surface 10a comprises a plurality of segments arranged over the entire reflecting surface. For example, the plurality of segments can be arranged in an array. Each segment has a predetermined shape, for example, rectangular shape. On each segment, a reflecting surface element 14 is arranged. In FIG. 2, a representative reflecting surface element 14 is hatched to explicitly show its area.

In the present embodiment, the reflecting surface 10a has the segments each having the same shape. For example, the reflecting surface 10a is divided at predetermined pitches in the X- and Y-axis directions, respectively. Each reflecting surface element 14 has a reflecting basic surface arranged to reflect light from the light bulb B in the optical axis Ax.

Then, a method of determining the reflecting surface of the reflecting mirror of a vehicle lamp will be described with illustrative reference to the above-described vehicle lamp.

Figure 3:
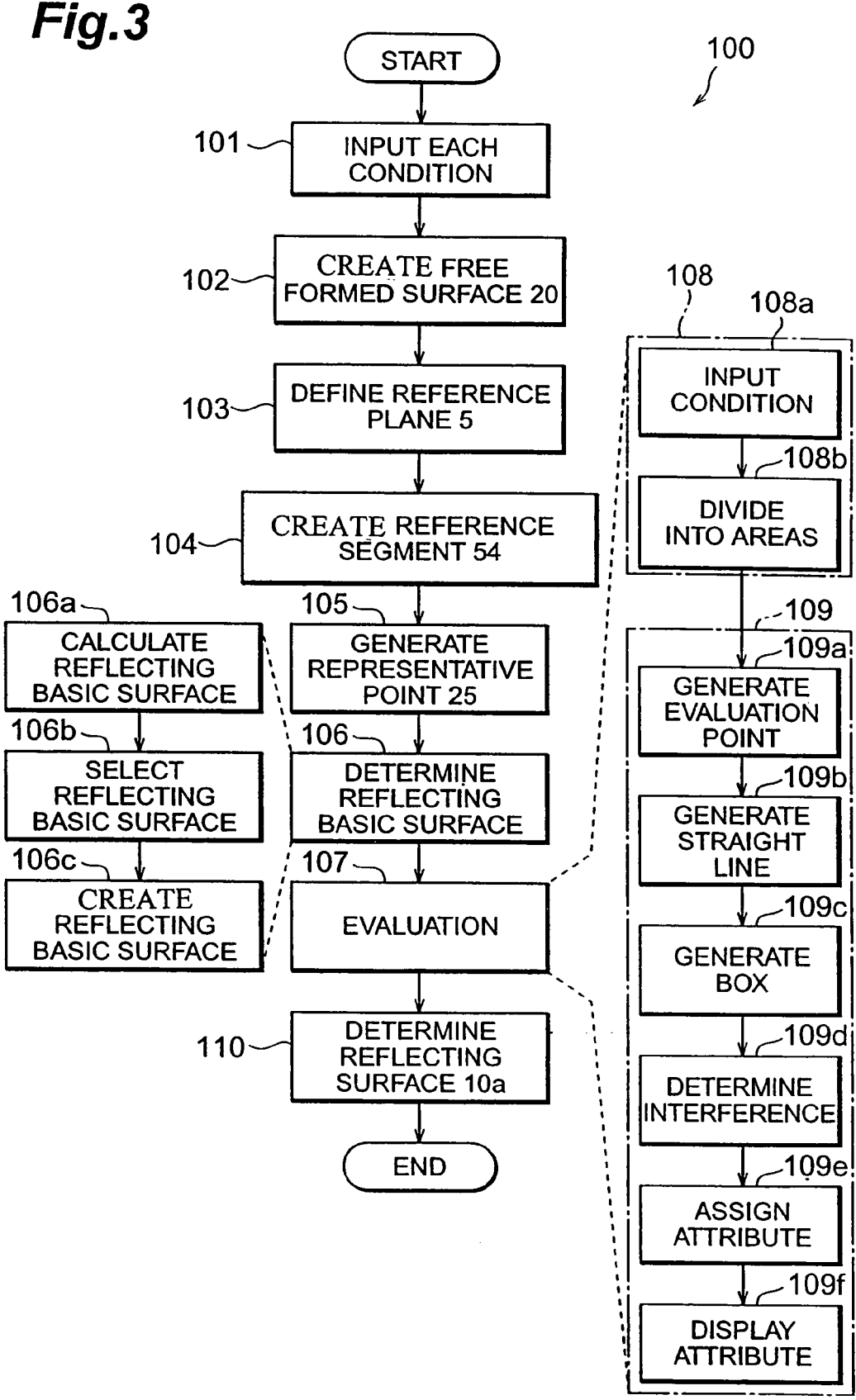
FIG. 3 is a flowchart showing a method of determining the reflecting surface of the reflecting mirror for a vehicle lamp.

FIG. 3 is a flowchart 100 for this determination. The present method has a condition setting step 101, a free formed surface creating step 102, a reference plane defining step 103, a reference segment creating step 104, a representative point generating step 105, a reflecting basic surface determining step 106, an evaluation step 107, and a reflecting surface determining step 110. The reflecting basic surface determining step 106 has a surface shape calculating step 106a, a surface shape selecting step 106b, and a surface shape creating step 106c. The evaluation step 107 has an area dividing step 108 and a judging step 109. The area dividing step 108 has a condition input step 108a and a division executing step 108b. The judgement step 109 has an evaluation point generating step 109a, a straight line generating step 109b, a box generating step 109c, an interference judgement step 109d, an attribute assigning step 109e, and an attribute displaying step 109f.

A part or all of these steps can be performed in the techniques of data processing by use of a computer. These techniques require one or more programs that can be executed on computers. However, the techniques according to the present embodiment can be realized not only by use of the software above but also a dedicated hardware.

Figure 4A:
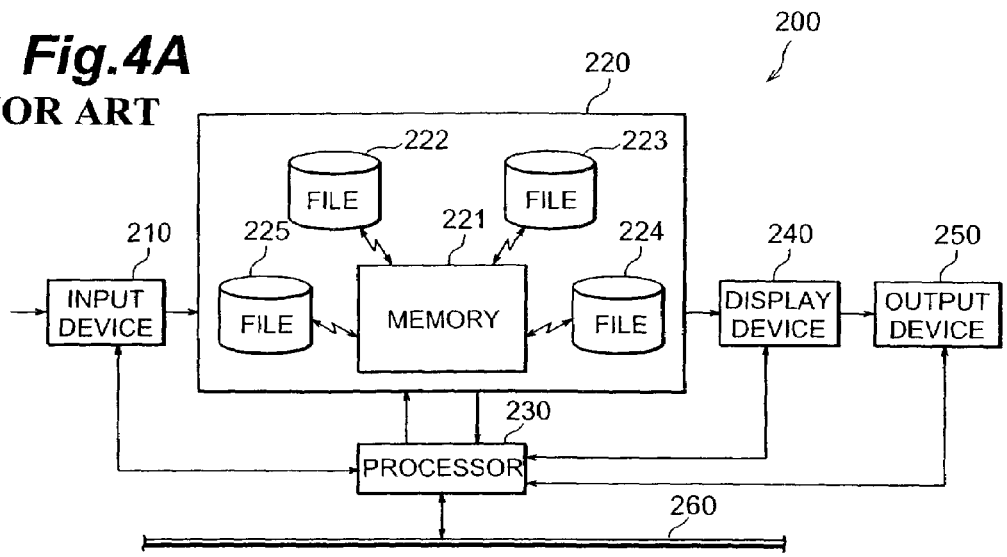
FIG. 4A is a schematic block diagram showing an evaluation system.
Figure 4B:
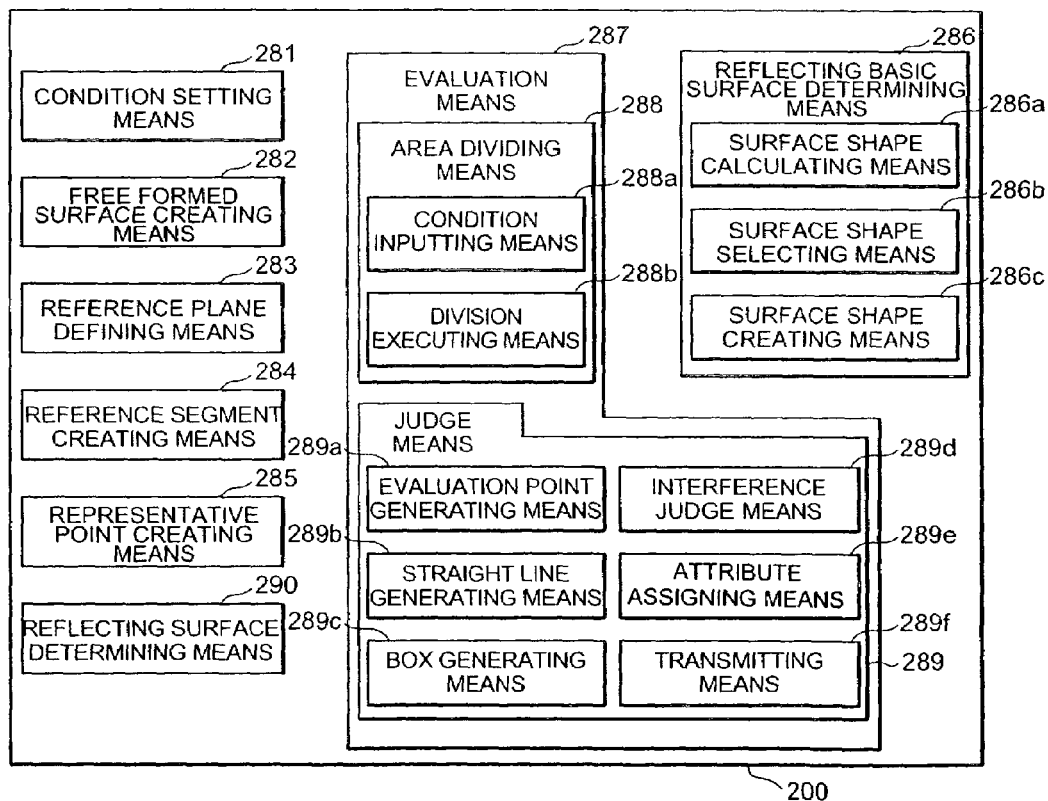
FIG. 4B is a functional block diagram showing an evaluation system.

FIGS. 4A and 4B show a system that can execute these programs. Referring to FIG. 4A, an evaluation system 200 comprises an input device 210, a memory unit 220, a processor 230, a display device 240 and an output device 250. In addition, the evaluation system 200 can be connected to another evaluation system such as another computer via a network 260, whereby the input of data and the execution of a program can be performed via the network.

The input device 210 can include at least one of, for example, a keyboard, a data reading device for a storage medium, and a pointing device. The memory unit 220 has a main storage device 221. This device 221 can store a program file 222, a design information file 223, an area division information file 224 and an attribute information file 225. The processor 230 can execute a program stored in the memory unit 220. Owing to this execution, one or more steps, which will be described below, are realized on the evaluation system. The results of the evaluation can be provided on the display device 240 and/or the output device 250.

In the system, for the convenience of design or for other reasons, design information obtained by executing a part of the above-described steps can be stored in the system after an arbitrary step. When the stored design information is entered to a computer, the program can execute the remaining processes.

The program realizing these processes can be distributed on a predetermined computer-readable storage medium. These storage media include, but not limited to, a magnetic medium such as a hard disk, a floppy disk or magnetic tape, an optical medium such as a CD-ROM or a DVD-ROM, a magneto-optical medium such as a floptical disk, or a hardware device, such as a RAM, a ROM and a semiconductor nonvolatile memory which is especially arranged to execute or store program commands.

FIG. 4B shows the functional blocks of the evaluation system. These functional blocks will be described below with reference to the respective steps.

Condition Setting Step 101, Condition Setting Means 281

In order to make determination as to the reflecting surface shape of a reflecting mirror for the vehicle lamp, first of all, the condition setting means 281 sets the various conditions required for shape determination. These conditions contain the position of the light source point F (light source position), and the optical axis Ax passing through the light source position F, a position at which the light bulb B of FIG. 1 is arranged. If required, the condition setting means 281 may set additional conditions. In addition to these conditions, the shape restriction condition, required from the design condition of the vehicle body, can be also set for the lamp or the reflecting mirror. The conditions to be set are entered via an appropriate input device (reference numeral 210 of FIG. 4A), and then can be stored on the memory unit (reference numeral 220 of FIG. 4A). This permits the following sequence to be executed on the computer.

Free Formed Surface Creating Step 102, Free Formed Surface Creating Means 282

Then, the free formed surface creating means 282 creates the free formed surface 20 constituting the basic shape of the reflecting surface 10a.

The free formed surface 20 is created so as to satisfy conditions from the functions of the lamp and shape restriction conditions for a vehicle shape. Although one of these functionality conditions is optical uniformity for the light reflection performance of the reflecting surface 10a, in general, light reflection performance required for lamps of one kind is different from that of another kind. Accordingly, the shape of the free formed surface 20 is determined so as to satisfy light reflection performance required for an individual lamp as well as conditions, set in the condition setting step 101, on the light source position (the light source bulb B and the light source point F) and the optical axis Ax.

Since the free formed surface 20 needs to satisfy shape restriction conditions such as a reduction in the thickness of the lamp, particularly strict shape restrictions, arising from the shape of the lamp accommodating portion in the vehicle body, may be imposed on a portion of the reflecting mirror. The free formed surface 20 is created so as to reduce a relative decrease, in the functionality conditions, that may occur in this portion of the reflecting mirror. Consequently, the free formed surface 20 has a shape which not only satisfies these shape restriction conditions but also satisfies performance conditions as well as possible.

Reference Plane Defining Step 103, Reference Plane Defining Means 283

Figure 5:
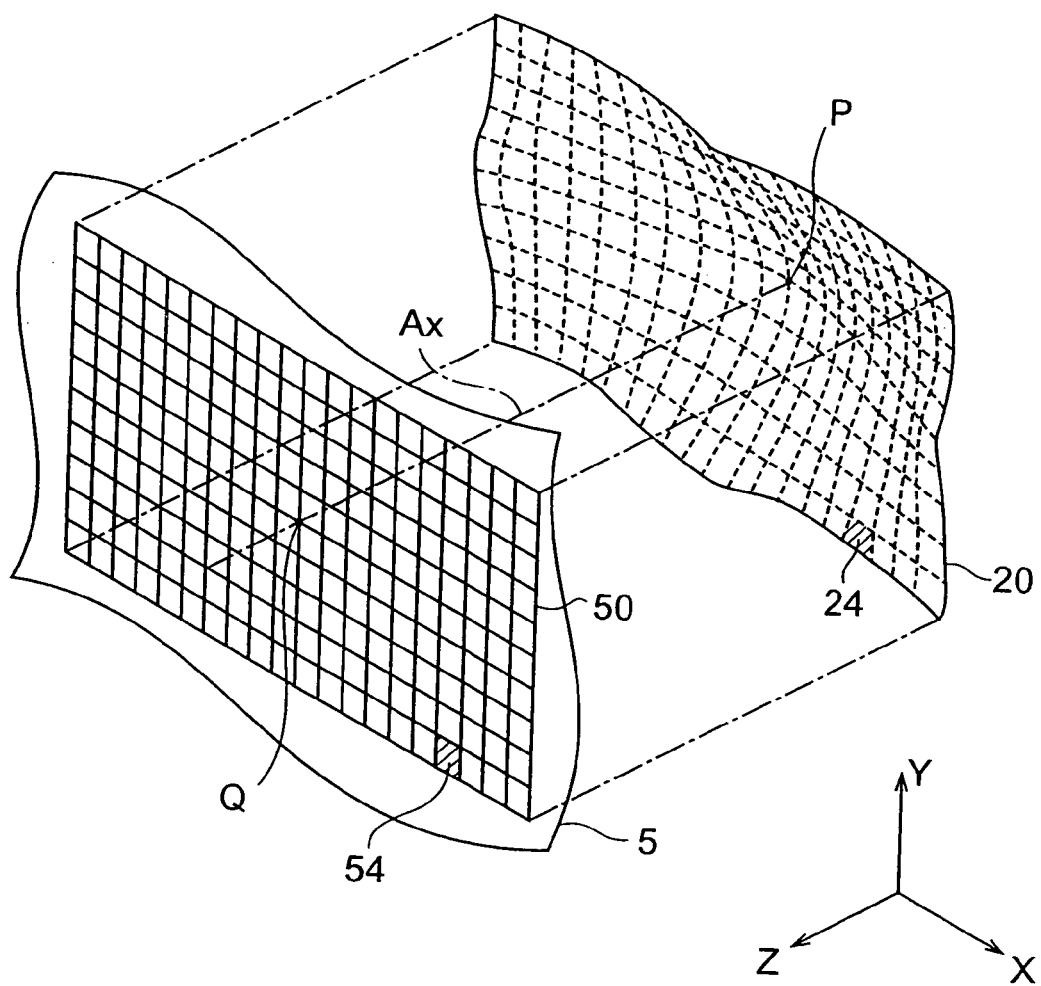
FIG. 5 is a view showing a free formed surface and a reference plane used to segment the free formed surface.

The reference plane defining means 283 defines a reference plane with respect to the free formed surface 20. FIG. 5 shows the reference plane 5 associated with the free formed surface 20, and the reference plane 5 is defined so as to face the free formed surface 20. The reference plane 5 is utilized to segment the free formed surface 20 and to determine a reflecting surface element shape, as will be described later. The reference plane 5 is adopted in the present embodiment. As shown in FIG. 5, the reference plane 5 is arranged parallel to the X-Y plane perpendicular to the optical axis Ax.

In the following description, projection operations between the reference plane 5 and the free formed surface 20 are performed with respect to the Z-axis, i.e., the optical axis Ax.

Reference Segment Creating Step 104, Reference Segment Creating Means 284

The reference plane defining means 284 segments the free formed surface 20 to form a plurality of segments by use of the reference plane 5. First of all, a predetermined area on the free formed surface 20 is projected onto the reference plane 5 so as to generate, on the reference plane 5, a reflecting-surface outside shape 50 which corresponds to the outside shape of the free formed surface 20. Thus, the point P on the free formed surface 20 and the optical axis Ax corresponds to a projected point Q on the reference plane 5. Then, a predetermined segmentation method is used to segment the area that the reflecting-surface outside shape 50 defines on the reference plane 5, whereby reference segments 54 are obtained on the reference plane 5.

In FIG. 5, the area inside the reflecting-surface outside shape 50 is divided at respective constant pitches along the X-axis and Y-axis into the reference segments 54, where the X-axis and Y-axis are perpendicular to the optical axis Ax and are provided in the reference plane 5. The reference segments 54 are provided in a predetermined arrangement. The arrangement of the reference segments 54 will be reflected to the arrangement of the reflecting surface elements 14 on the reflecting mirror 1 shown in FIG. 2.

Representative Point Generating Step 105, Representative Point Generating Means 285

Then, the representative point generating means 285 provides each reference segment 54, generated in the reference segment creating step 104, with one or more reference representative points. The reference segments 54 and the reference representative points therefor are projected back onto the free formed surface 20 to generate segments and representative points on the free formed surface 20.

Figure 6:
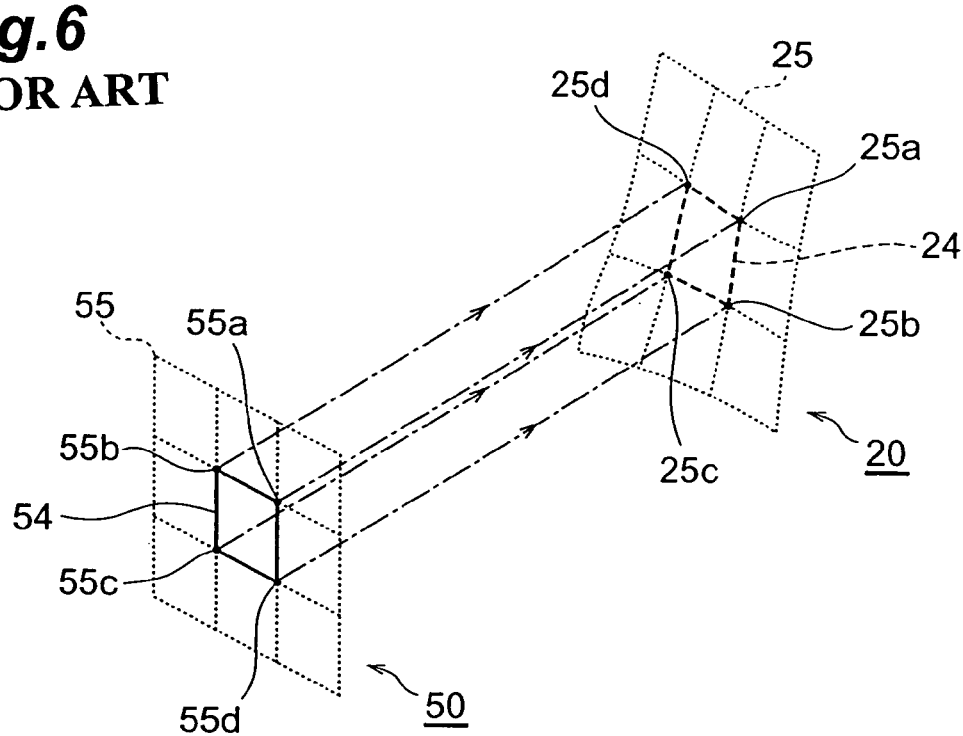
FIG. 6 is a view showing reference segments on the reference plane and segments on the free formed surface.

FIG. 6 diagrammatically shows an area 55 as well as a corresponding area 25 on the free formed surface 20. The area 55 contains the reference segments 54 in the reflecting-surface outside shape 50 shown in FIG. 5. FIG. 6 shows one of the reference segments 54 made in solid lines. For the reference segments 54, reference representative points are selected. In the present embodiment, the four vertices 55a to 55d of the rectangle are used as reference representative points in the rectangular segments 54. However, the selection of the reference representative points is not limited to this way. For example, it is possible to select another point, such as the intersection of the diagonal lines of the rectangle.

In FIG. 6, a segment 24 shown by dashed lines corresponds to the reference segment 54 shown by solid lines. This correspondence determines the number and position of representative points to be projected from the reference segments 54. The reference representative points 55a to 55d are selected in each reference segment 54 on the reference plane 5. As shown in FIG. 6, the reference segments 54 and the reference representative points 55a to 55d are projected onto the free formed surface 20 to generate the segment 24 and representative points 25a to 25d provided so as to segment the free formed surface 20.

The representative points 25a to 25d, as described later, are utilized to arrange the reflecting surface element 14 for the segment 24. In other words, the points in the segment 24 are used to determine a reflecting basic surface for the reflecting surface element 14 to be assigned to the segment 24.

The representative point generating step 105, which is described above, and the surface shape determining step 106, which will be described below, are sequentially applied to the segment 24 and the reference segment 54, whereby the representative points are generated and the surface shapes are determined on all the segments such as the segment 24. By the repetition of these steps, the segments, such as the segment 24, are created over the whole of free formed surface 20.

As shown in FIG. 5 by dashed lines, the segments are arranged on the free formed surface 20 in an array as seen in the Z-axis direction. In FIG. 6, the reference segment 54 and the segment 24 correspond to the reflecting surface element 14 hatched in FIG. 2.

Reflecting Basic Surface Determining Step 106, Reflecting Basic Surface Determining Means 286

The reflecting basic surface determining means 286 determines a reflecting basic surface for the segment 24. Thus, the reflecting basic surface determining step 106 comprises a reflecting basic surface calculating step 106a, a reflecting basic surface selecting step 106b, and a reflecting basic surface creating step 106c.

Reflecting Basic Surface Calculating Step 106a, Reflecting Basic Surface Calculating Means 286a The reflecting basic surface calculating means 286a calculates a shape parameter defining the shape of a reflecting basic surface for each of the representative points 25a to 25d in the segment 24.

Figure 7:
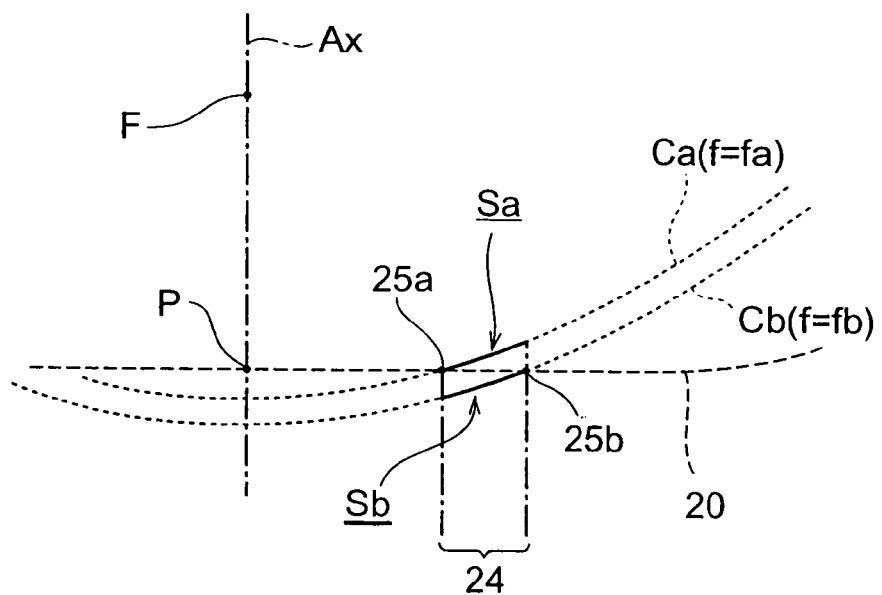
FIG. 7 is a diagrammatic view showing the derivation of shape parameters for respective representative points of a segment.

FIG. 7 is a schematic view illustrating the calculation of the shape parameter for each of the representative points. For the sake of simplicity, FIG. 7 shows a cross-sectional view, taken along a plane containing the optical axis Ax, of the free formed surface 20. The representative points 25a to 25d of the segment 24 disposed on a curve will be described by way of illustration. In the present embodiment, a predetermined paraboloid of revolution is used to the reflecting basic surface of the reflecting surface element 14 assigned to the segment 24, but this is not limited thereto. For example, a flat plane can be also used therefor.

Shape parameters, such as focal length f having values fa and fb, are calculated with respect to the two representative points 25a and 25b that are used in determining the shape of the reflecting basic surface. In FIG. 7, the paraboloid having the focal length fa to the representative point 25*a* is shown by a curve Ca, while the paraboloid of the focal length fb to the representative point 25*b* is shown by a curve Cb. The paraboloids of revolution Ca and Cb, which have different focal lengths f, are generated to correspond to the different representative points 25*a* and 25*b*.

The assigned paraboloids of revolution have the central axis of revolution, i.e., the optical axis Ax, as well as a focal point, i.e., the light source point (light source position) F. The focal lengths f of the respective paraboloids are calculated from the light source point F and the optical axis Ax as well as the position of the segment 24 on the free formed surface 20, so that light from the light source point F can be reflected in the direction of the optical axis Ax. In this case, the focal lengths f of the paraboloids of revolution can be used as shape parameters for specifying a reflecting basic surface.

Further, in the segment 24 of FIG. 6, four focal lengths for the respective representative points 25*a* to 25*d* are calculated in a similar way by use of the focal lengths f of the paraboloids of revolution as shape parameters.

Reflecting Basic Surface Selecting Step 106*b*, Reflecting Basic Surface Selecting Means 286*b*

The reflecting basic surface selecting means 286*b*, selects a shape parameter to be applied to the reflecting basic surface in the segment 24, from the shape parameters, calculated in the reflecting basic surface calculating step 106*a*, of the respective representative points 25*a* to 25*d*.

Referring to FIG. 7, the selection of this shape parameter will be described below. In FIG. 7, the focal lengths fa and fb are calculated as shape parameters for the representative points 25*a* and 25*b* of the segment 24, respectively. One of these focal lengths fa and fb is used as a focal length fx in order to define the reflecting basic surface of the segment 24.

If the focal length fa is applied to fx, the reflecting basic surface in the segment 24 is a surface Sa shown by solid lines in FIG. 7. If the focal length fb is applied to fx, the reflecting basic surface in the segment 24 is a surface Sb. An appropriate shape are selected for the segment 24 from the surface shapes that correspond to the respective focal lengths. It is determined, in view of the uniformity of reflecting performance, which of the focal lengths should be selected.

As is apparent from the illustrative description made with reference to FIG. 7, the focal length fx, which is used to determine the shape of the reflecting basic surface of the reflecting surface element 14, is selected from four focal lengths calculated on the basis of the positions of the respective representative points 25*a* to 25*d*. To select a shape parameter for the reflecting basic surface of the reflecting surface element 14, it is possible to take into account the conditions imposed on the reflecting mirror 2 and the relative position of the light source bulb B relative to the segment 24. The range of light incident on the reflecting basic surface of each reflecting surface element 14 changes according to the relative positional relationship between this reflecting basic surface and other reflecting basic surfaces, adjacent thereto, of the reflecting surface elements 14. The amount of light incident thereon also changes according to this relative relationship in their arrangement. Therefore, the shape parameters may be chosen while the relative arrangement relationship is taken into account.

Reflecting Basic Surface Creating Step 106*c*, Reflecting Basic Surface Creating Means 286*c*

The reflecting basic surface selecting means 286*c* creates, on the basis of the selected shape parameter, the reflecting basic surface of the reflecting surface element 14 to be assigned to the segment 24.

Figure 8:
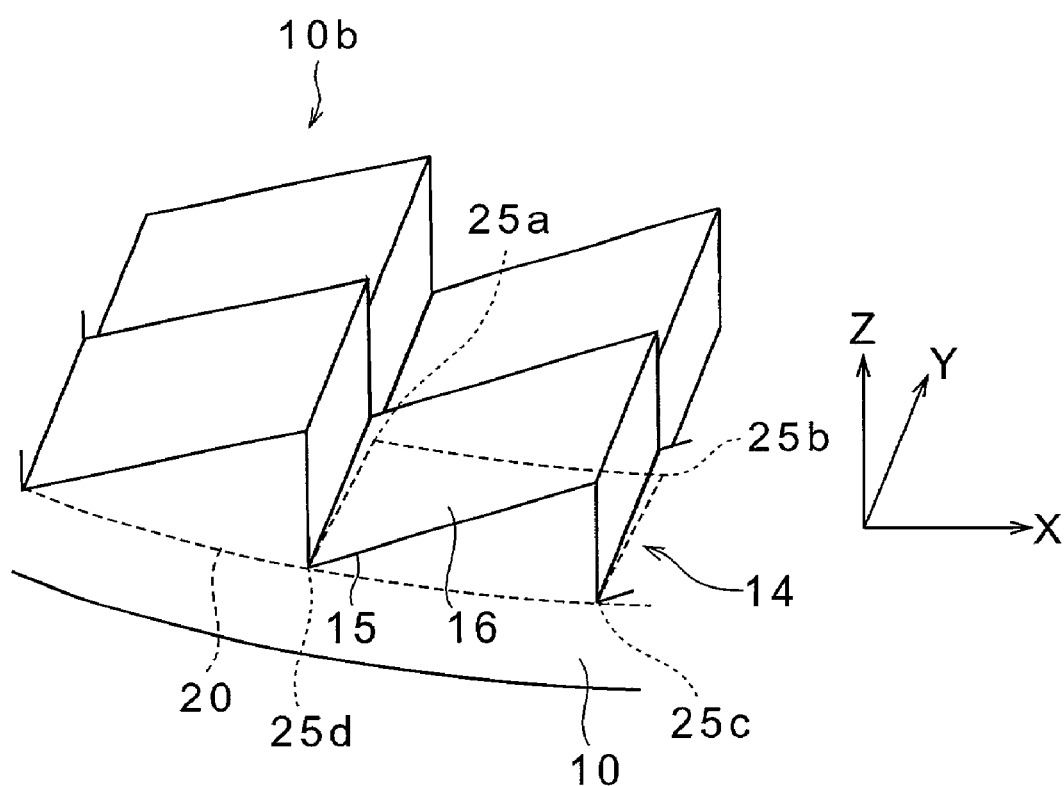
FIG. 8 is a view showing one example of the reflecting basic surface of a reflecting surface element.

FIG. 8 is a perspective view showing a reflecting surface 10*b*, by way of example, which is partially cut out to show the shape of the reflecting basic surface 15 of the reflecting surface element 14. A paraboloid of revolution having the focal length fx is applied to the reflecting basic surface 15 for the reflecting surface element 14.

The typical size of the reflecting basic surface 15 can be approximately 3 mm to 20 mm.

The design information determined in this manner can be temporarily stored in the computer system 200 for the subsequent evaluation step, or can be transferred to an adequate storage for the subsequent processing. The plurality of reflecting basic surfaces can be expressed in a format, such as a NURBS curved surface or a Bezier curved surface.

Reflecting Basic Surface Evaluating Step (Step 107), Reflecting Basic Surface Evaluating Means 287

Figure 9A:
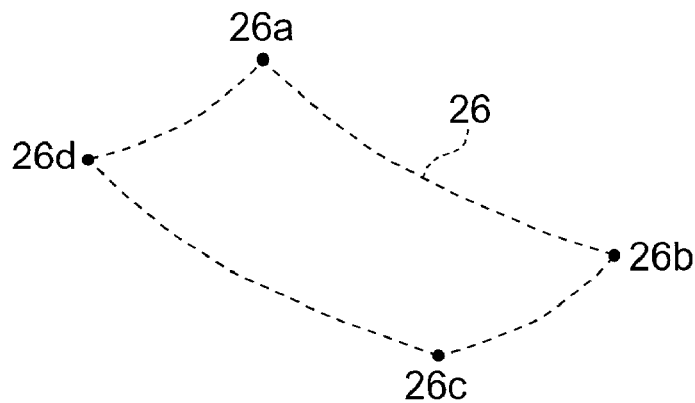
FIGS. 9A to 9C are views showing the division of a reflecting basic surface.
Figure 9B:
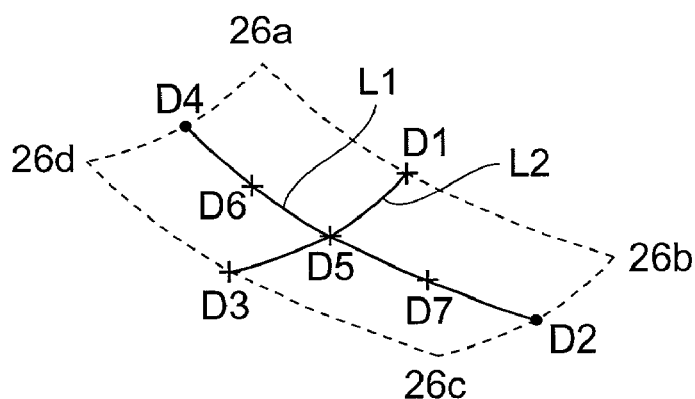
Figure 9C:
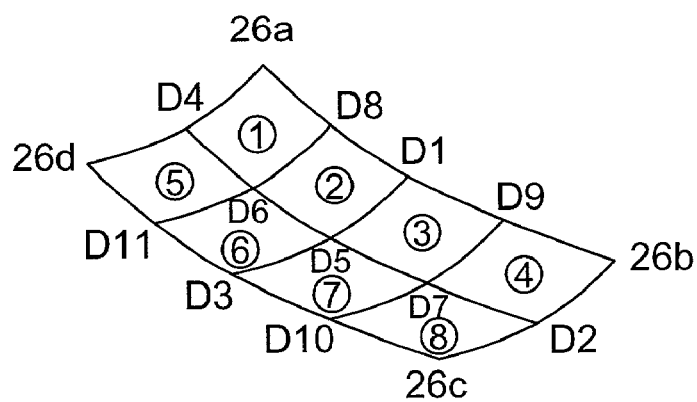

FIGS. 9A to 9C show one reflecting basic surface 26 that is arbitrarily selected from the reflecting basic surfaces. The reflecting basic surface 26 of FIGS. 9A and 9B, expressed on the basis of design information, is shown by dashed lines in order to distinguish it from divided-area information to be calculated later.

Steps in the evaluation step 107 will be described below. The area dividing step 108 has the condition input step 108*a* and the division executing step 108*b*. The evaluating means 287 may include area dividing means 288 and judgement means 289. The area dividing means 288 may include condition input means 288*a* and division executing means 288*b*.

Condition Input Step 108*a*, Condition Input Means 288*a*

In order to execute the subsequent processes with a computer program provided on the system, both the design information obtained after the processes up to the step 106 and the position information on the light source of the vehicle lamp can be provided into the system, specifically, into the memory 221 via input means such as an input device. The following processing steps can start after the input.

Division Executing Step 108*b*, Division Executing Means 288*b*

Then, the division executing means 288*b* divides one reflecting basic surface 26, selected from reflecting basic surfaces, into a plurality of areas on the basis of design information. Referring to FIG. 9A, the shape of the reflecting basic surface 25 reflects the shape of the reference segment 54. In the present embodiment, the shape of the reflecting basic surface 25 is a rectangle defined by four vertices 26*a* to 26*d*. The present embodiment is described with illustrative reference to a rectangular reflecting basic surface, but the present embodiment is not limited thereto. For example, the present embodiment may be similarly applied to a closed figure that is formed by sequentially connecting three or more vertices without the intersection thereof. Referring to FIG. 9B, the reflecting basic surface 26 is expressed on the basis of design information and is defined by four sides (26*a*–26*b*, 26*b*–26*c*, 26*c*–26*d* and 26*d*–26*a*). Points D1 to D4 are respectively provided on these four sides so as to divide the respective sides into two parts. Lines L1 and L2 are generated on the reflecting basic surface 26 such that each of lines L1 and L2 connects the division points disposed on the opposite sides of the reflecting basic surface 26. These lines L1 and L2 intersect at a point D5 on the reflecting basic surface 26.

Division points D6 to D11 are generated on these curves L1 and L2 to divide the reflecting basic surface 26 into a number of areas having appropriate sizes. In the present embodiment described above, the reflecting basic surface 26 is divided into quadrilateral areas, but the present invention is not limited thereto.

In the example shown in FIG. 9C, the reflecting basic surface 26 is divided into the areas ① to ⑧. These areas are polygons. The data on these areas are stored as divided area information. The divided area information is generated in association with design information, whereby each of the reflecting basic surfaces can be associated with the divided area information, which contains a plurality of areas for each reflecting basic surface.

Figure 10:
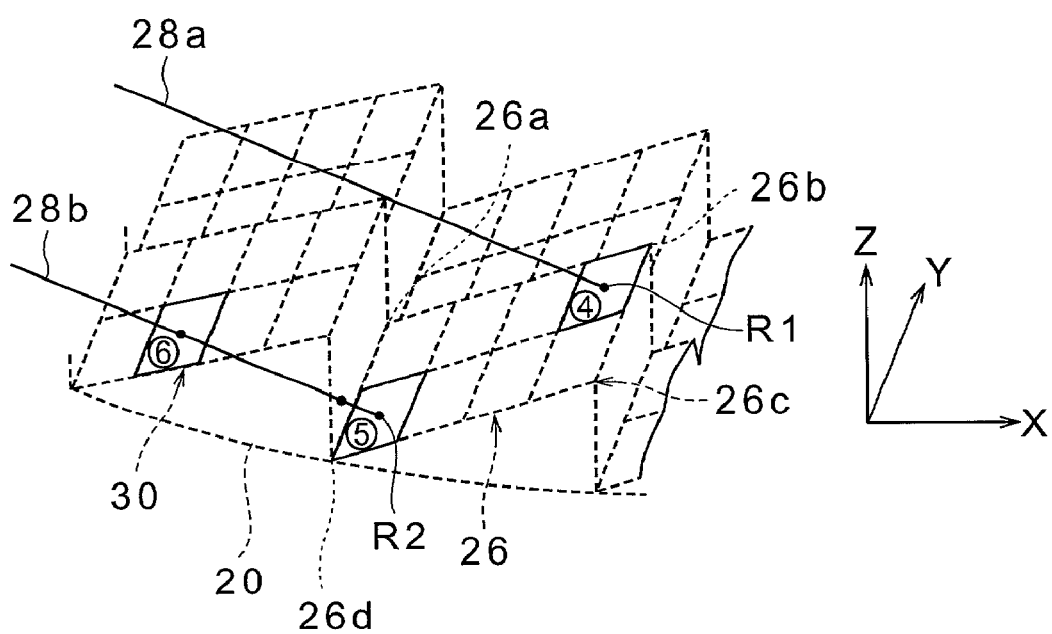
FIG. 10 is a view showing one example of divided reflecting basic surfaces.

The dividing procedure above has been described with respect to the single reflecting basic surface 26, and is similarly applied to the remaining reflecting basic surfaces of the basic surfaces. Referring to FIG. 10, the individual reflecting basic surfaces are divided in this manner are arranged on the free formed surface 20. Since the divided area information is associated with the design information, the divided area information can be displayed on the free formed surface 20 contained in the design information.

In the determination step 109, it is determined whether imaginary light from the light source position can effectively reach each of the areas (1) to (8). The following description will be made in connection with determinations as to the area (4) and the area (5), but can be similarly applied to the remaining areas. The determination step 109 has the following steps: an evaluation point generating step 109a; a straight line generating step 109b; a box generating step 109c; an interference judgment step 109d; an attribute assigning step 109e; and an attribute displaying step 109f. The evaluation means 287 can include the following means: an evaluation point generating means 289a; a straight line generating means 289b; a box generating means 289c; an interference judgment means 289d; an attribute assigning means 289e; and a transmitting means 289f.

Evaluation Point Generating Step 109a, Evaluation Point Generating Means 289a

Then, the evaluation point generating means 289a generates evaluation points R1 and R2 for the respective areas ④ and ⑤. In the present embodiment, the evaluation points R1 and R2 are defined by, but not limited to, the average values of the vertex coordinates that define the figure of each area above. For example, the coordinates of the evaluation points R1 and R2 are obtained from the following arithmetical average expressions:

$$R1 = (D9 + 26b + D2 + D7)/4$$

$$R2 = (D4 + D6 + D11 + 26d)/4$$

Straight Line Generating Step 109b, Straight Line Generating Means 289b

Then, the straight line generating means 289b generates straight lines 28a and 28b which pass through both light source point F, shown in FIG. 7, and respective evaluation points R1 and R2.

Box Generating Step 109c, Box Generating Means 289c

Figure 11:
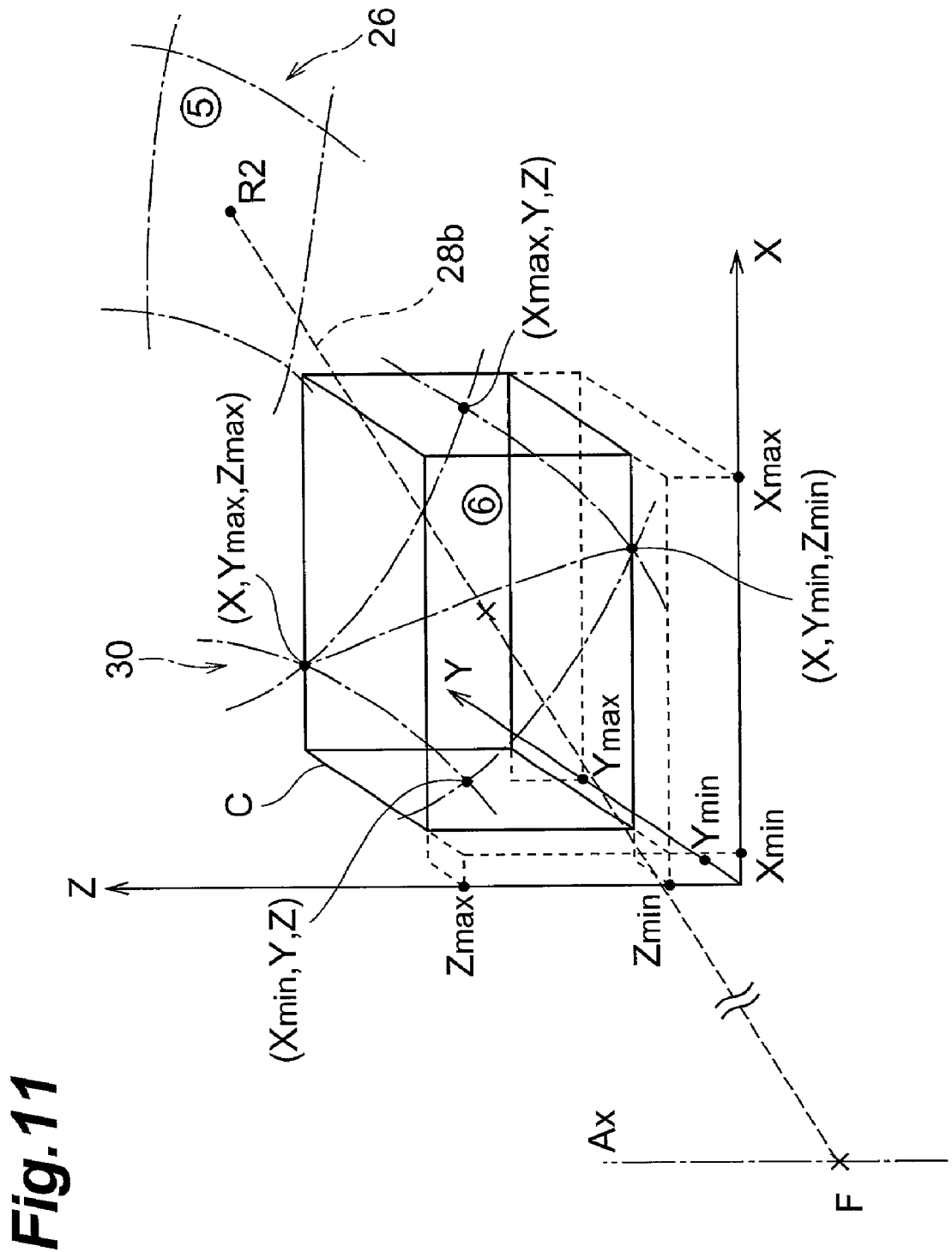
FIG. 11 is a view showing a MIN-MAX box.

A judgement is made as to the interference of another reflecting basic surface and the straight lines 28a and 28b. For this judgement, the box generating means 289c applies a MIN-MAX box method to the other reflecting basic surfaces. In the subsequent description, the sequence of generating a MIN-MAX box is described with respect to the area ⑥ of the plurality of areas that constitute another reflecting basic surface 30, but the MIN-MAX box method can also be applied to the other reflecting basic surface itself. For each of the X-, Y- and Z-coordinates of four vertices that defines a polygon, a maximum value and a minimum value are derived. The respective X-, Y- and Z-coordinates are combined so as to form a rectangular parallelepiped C having these vertices. FIG. 11 shows the rectangular parallelepiped C. The rectangular parallelepiped C is defined by three pairs of planes which are respectively disposed in parallel with the XY plane, the YZ plane and the ZX plane and pass through the above-described vertices.

Interference Judgement Step 109d, Interference Judgement Means 289d

The interference judgement means 289d makes judgement as to, for example, the intersection of the rectangular parallelepiped C and the straight line 28a in the area ④. Referring to FIG. 10, since the area ④ does not have intersection relationship to any of the reflecting basic surfaces, it is determined that "no interference occurs" in any of the MIN-MAX boxes Then, the interference judgement means 289d makes judgement as to the intersection of the rectangular parallelepiped C and the straight line 28b in the area ⑤. Referring to FIG. 10, since the area ⑤ has intersecting relationship to the area ⑥ of the reflecting basic surface 30, it is determined that "interference occurs" in a MIN-MAX box.

If the MIN-MAX box method is used in this manner, it is convenient to judge, with respect to the X-, Y- and Z-axes, the interference of a box and lines extending in directions to the light source.

A polygon area to which the judgement of "interference occurs" has been made is further divided into a plurality of triangles. Three vertices are selected so that these triangles are not superposed on one another. In the example shown in FIG. 10, the parallelepiped ⑥ is divided into two triangles. The plane that passes through the three vertices of a certain triangle can be obtained. The intersection of this plane and the straight line 28b is obtained. It is determined whether the X-, Y- and Z-coordinates of the intersection are inside or outside the triangle. If they are inside the triangle, it is determined that "intersection occurs". If they are outside the triangle, it is determined that "no intersection occurs". This operation is performed for each of the triangles. Consequently, if no intersection occurs with respect to any of the triangles, it is determined that "no interference occurs". If intersection occurs with respect to any of the triangles, it is determined that "interference occurs."

This judgement is repeatedly made as to each area of a part or all the reflecting basic surfaces.

Attribute Assigning Step 109e, Attribute Assigning Means 289e

On the basis of this judgement, the attribute assigning means 289e assigns an attribute to each of the plurality of areas ① to ⑧. The assigned attribute is, for example, a digital value "0," indicating "interference," or a digital value "1," indicating "no interference." The assignment of these attributes is performed on a part or all of the reflecting basic surfaces.

It is preferable that the attribute information be generated so as to be associated with at least one of the design information and the divided area information. Owing to this association, the attribute information can be efficiently displayed.

Figure 12:
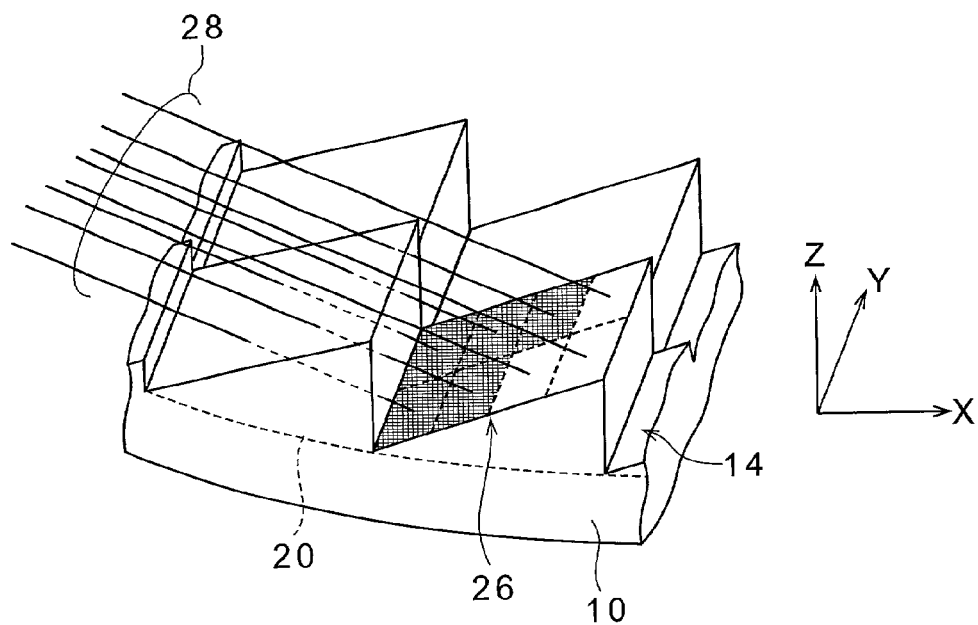
FIG. 12 is a view showing attributes to a reflecting basic surface.

FIG. 12 is a view showing attribute information with respect to a single reflecting basic surface. It is determined that "interference occurs" in the areas ① to ③, ⑤ and ⑥, and these areas are hatched.

Attribute Displaying Step 109f

Figure 13:
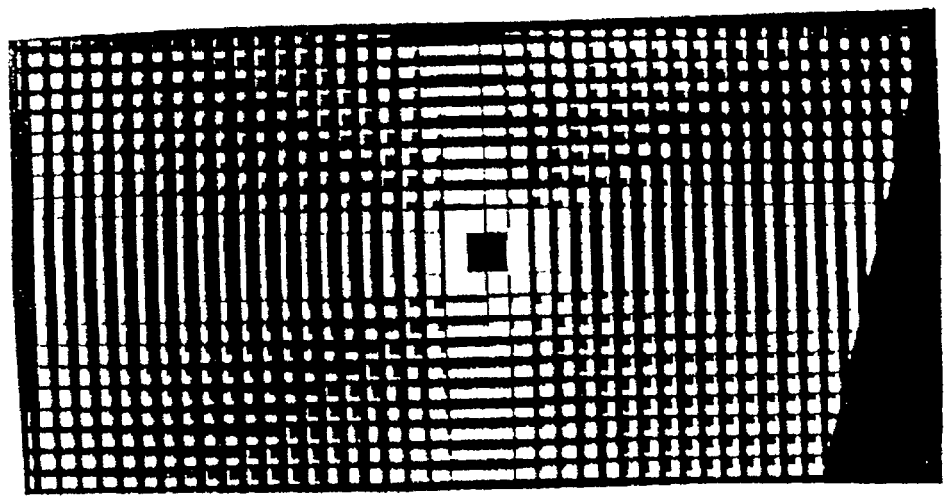
FIG. 13 is a view showing attributes over the whole of a reflecting mirror.

FIG. 13 shows an image when the attributes of the entire reflecting basic surface are displayed on the display device. When attribute information is transmitted to the display device through the transmitting means 289f, this attribute information is displayed such that the attribute information corresponds to a basic curved surface, i.e., design information. To easily understand reflection performance from the image, the image should show reflection performance as viewed in the axis Ax. In addition, the areas in which light is reflected are displayed in white, the areas in which no light is reflected are displayed in black. This display facilitates the visible understanding of the reflection performance. Incidentally, the transmitting means 289f may transmit not only the attribute information but also various data to be displayed on the display device.

Accordingly, this image allows designers to observe the uniformity of reflection as a whole. On the basis of this observation, it can be determined whether or not the designing process can proceed to the next design step.

If it is determined that redesigning is needed, a design step starts again to make determination as to predetermined design information, for example, a free formed surface of a basic curved surface.

If the process proceeds to the next design step, the process can proceed to a reflecting surface determining step as follows.

Reflecting Surface Determining Step 110, Reflecting Surface Determining Means 290

A description will be made with reference to the reflecting basic surface 15 shown in FIG. 14. Reflecting surface determining means 290 assigns the reflecting surface elements 14 to the respective segments 24 with respect to the reflecting basic surface 15 in order to determine the reflecting surface 10a which contains the reflecting surface elements 14.

Figure 14:
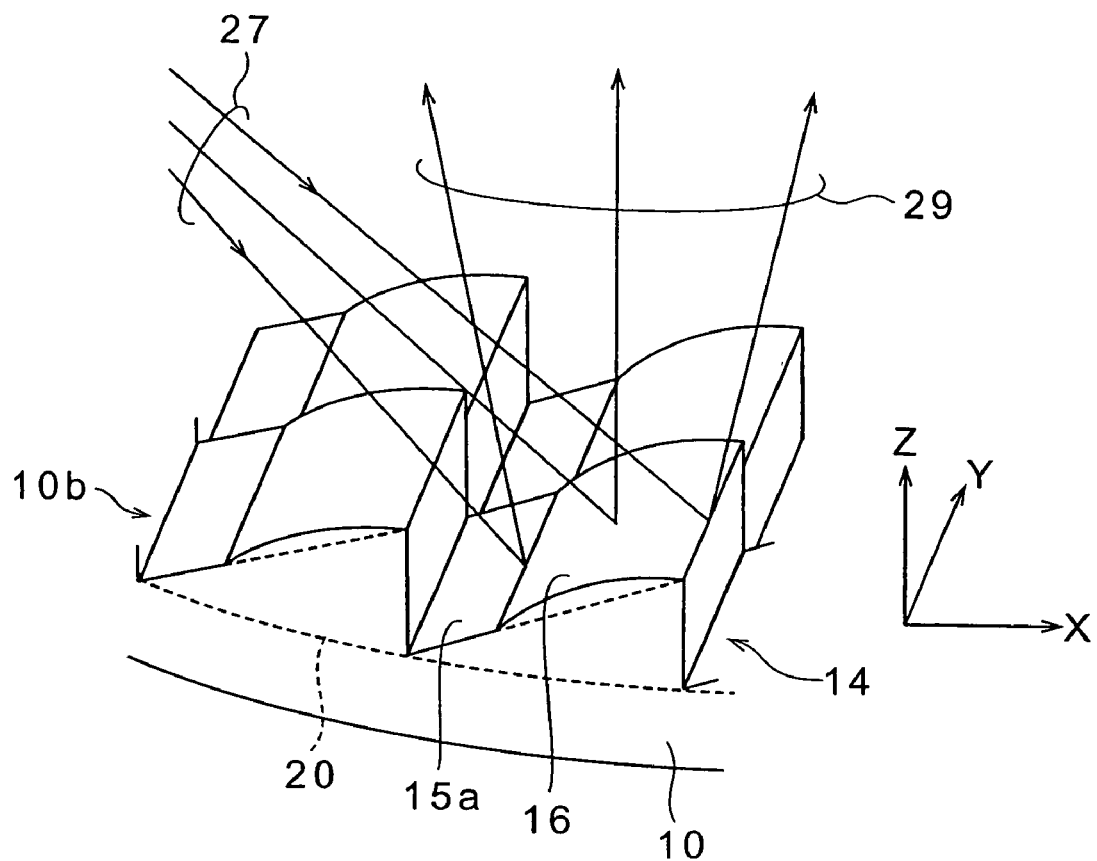
FIG. 14 is a view showing reflecting surface elements that are provided with a diffusing step.

Referring to FIG. 14, each of the reflecting basic surfaces of the reflecting surface elements 14 comprises a paraboloid portion 15a and a diffusing reflecting portion 16.

In the present embodiment, the reflecting surface elements 14 are made of the paraboloid portion 15a and the diffusing reflecting portion 16. The paraboloid portion 15a has the shape of a paraboloid of revolution having a focal length fx. The diffusing reflecting portion 16 protrudes in a convex shape with respect to the shape of paraboloid of revolution having a focal length fx so as to provide a predetermined light diffusing function. In FIG. 14, particularly, the adjacent reflecting surface element 14 casts a shadow over the paraboloid portion 15a, while the light source bulb B illuminates the diffusing reflecting portion 16. Thus, FIG. 14 shows that the incident light 27 is reflected in the diffusing reflecting portion 29 to form reflected light 29.

In the reflecting surface element 14 shown in FIG. 14, the diffusing reflecting portion 16 is formed to have a predetermined cylindrical side surface that can diffuse light in only the X-axis direction, i.e., a so-called cylindrical side shape. The reflected light is approximately parallel in the Y-axis direction. In this case, the lens 3 having lens steps 3a (refer to FIG. 1) is used to obtain a light diffusing function in the Y-axis direction.

The diffusing reflecting portion may have a surface shape with light diffusing function in both of the X- and Y-axis directions. The reflecting surface elements 14 may be made of only the paraboloid portion 15a. In this case, the diffusion of light is performed by only the lens. The shape of the diffusion reflecting portion is not limited to the above-described examples, and can employ, in addition to a cylindrical convex shape, a cylindrical concave shape, and a shape to which a mere plane may be used instead of a paraboloid of revolution.

For example, when a reflecting mirror is produced from a resin molding by use of a metal mold, the shape of a forming mold is transferred to the individual reflecting surface. Thus, in the determination of the reflecting surface shape, since the reflecting surface shape is restricted by the shapes of cutters used in metal mold manufacturing, it is necessary to take into account the conditions of metal mold manufacturing. Further, it is preferable to determine the shape of the reflecting surface so that light losses due to stepped portions at the boundary between the reflecting surface elements can be reduced.

The segment shape of the reflecting surface 10a is not limited to the rectangular shape as shown in the present embodiment. It is possible to create the reference segments 54 by segmenting the inside of the reflecting surface outside shape 50, radially, i.e., in the directions of radius vectors from the center of the intersection of the reference plane 5 and the optical axis Ax, and concentrically about this intersection. If these reference segments 54 are projected thereon, the shapes of the segments 24 and the reflecting surface elements 14 assume sector shapes as observed in the Z-axis direction. The present embodiment can also be applied to the shapes of the reflecting basic surfaces generated from these segments. In addition to this variation, various segment shapes can be applied. The present invention is not limited to the design of indicator lamps, and the above-described method can be used for reflecting mirrors for use in various kinds of vehicle lamps.

Having described the sequence of judgement on whether any of the plurality of areas that are associated with one reflecting basic surface interferes with a plurality of areas which are associated with another reflecting basic surface, it is also possible to determine whether the occurrence of the interference with one reflecting basic surface can be determined without determining the interference with the plurality of areas that are associated with the other reflecting basic surface. In the method of evaluating the reflection performance of a reflecting mirror, the method may include the step of applying the area dividing step 108 and the judgement step 109 to a reflecting basic surface selected repeatedly from the remaining reflecting basic surfaces. This allows the division, the determination and the attribute assignment for each reflecting basic surface.

As described above in detail with reference to the drawings, in an evaluation system and a method of evaluating the reflection performance of a reflecting mirror designed for a vehicle lamp according to the present invention, attribute information is displayed for each of the areas, whereby the attribute information can be grasped for each area smaller than a reflecting basic surface. These attributes show the reflection performance of individual basic reflecting surfaces. In addition, in the evaluation system, the design information and position information can be stored in a memory. The attribute information derived based on these information is transmitted to a display device, whereby the display device visualizes the attribute information. In this manner, it is possible to visibly recognize whether light from a light source position can effectively reach each of the areas.

Accordingly, there have been provided a method of evaluating the reflection performance of a reflecting mirror designed for a vehicle lamp, an evaluation system for evaluating the reflection performance of a reflecting mirror, and a computer-readable medium storing a program for evaluating the reflection performance of a reflecting mirror.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of evaluating the reflection performance of a reflecting mirror designed for a vehicle lamp, comprising:
   a) entering design information and position information, the design information representing a plurality of reflecting basic surfaces which constitute the reflecting mirror, and the position information containing a light source position in the vehicle lamp; and
   b) displaying attribute information concerning an attribute indicative of whether imaginary light from the light source position can effectively reach each of a first plurality of areas into which a first reflecting basic surface, selected from among the plurality of reflecting basic surfaces, is divided on the basis of the design information;
   wherein the plurality of reflecting basic surfaces are discrete surfaces,
   d) generating divided area information so as to be associated with the design information, the divided area information being indicative of the first plurality of areas of the first reflecting basic surface selected from among the plurality of reflecting basic surfaces and divided into the first plurality of areas on the basis of the design information;
   e) making a determination, on the basis of the divided area information and the design information, as to whether the imaginary light from the light source position can effectively reach each of the first plurality of areas of the first reflecting basic surface; and
   f) generating the attribute information for each of the first plurality of areas on the basis of the determination, the attribute information being associated with at least one of the design information and the divided area information;
   wherein (b) further includes: providing an evaluation point within each of the first plurality of areas;
   generating a straight line, the straight line connecting the evaluation point to the light source position; and
   determining whether the straight line intersects another reflecting basic surface other than the first reflecting basic surface which is associated with the first plurality of areas.

2. The method according to claim 1, further comprising:
   c) displaying attribute information concerning an attribute indicative of whether imaginary light from the light source position can effectively reach each of a second plurality of areas into which each of the remaining reflecting basic surfaces is divided on the basis of the design information.

3. The method according to claim 1, further comprising:
   g) applying (d) to a second reflecting basic surface sequentially selected from the remaining reflecting basic surfaces to update the divided area information, the divided area information being assiocated with the design information;
   h) applying (e) and (f) to the second reflecting basis surface sequentially selected from the remaining reflecting basis surfaces to update the attribute information, the attribute information being associated with at least one of the design information and the divided area information; and
   i) displaying the updated attribute information concerning the attribute with respect to each of the plurality of areas into which each of the remaining reflecting basic surfaces is divided on the basis of the design information.

4. The method according to claim 1, wherein the first plurality of areas into which a first reflecting basic surface is divided are equally sized and repetitively arranged.

5. The method according to claim 1, wherein the plurality of reflecting basic surfaces are non-continuous.

6. An evaluation system for evaluating reflection performance of a reflecting mirror designed for a vehicle lamp, comprising:
   a memory;
   a display device which displays received information;
   input means for entering design information and position information of a light source position in the vehicle lamp to store the entered information in the memory, the design information being indicative of a plurality of reflecting basic surfaces which constitute the reflecting mirror; and
   first transmitting means for transmitting, to the display device, attribute information concerning an attribute indicative of whether imaginary light from the light source position can effectively reach each of a first plurality of areas into which a first reflecting basic surface, selected from among the reflecting basic surfaces, is divided on the basis of the design information;
   wherein the plurality of reflecting basic surfaces are discrete surfaces;
   first division means for generating divided area information so as to be associated with the design information, the divided area information including area data on the first plurality of areas of the first reflecting basic surface selected from among the reflecting basic surfaces and is divided into the first plurality of areas on the basis of the design information;
   first determination means for making a determination, on the basis of the divided area information and the design information, as to whether the imaginary light from the light source position can effectively reach each of the first plurality of areas of the first reflecting basic surface;
   first attribute means for generating, on the basis of the determination, the attribute information for each of the first plurality of areas, the attribute information being associated with at least one of the design information and the divided area information; and
   wherein the first determination means makes the determination of whether the imaginary light from the light source position can effectively reach each of the first plurality of areas by:
   providing an evaluation point within each of the first plurality of areas;
   generating a straight line, the straight line connecting the evaluation point to the light source position; and
   determining whether the straight line intersects another reflecting basic surface other than the first reflecting basic surface which is associated with the first plurality of areas.

7. The evaluation system according to claim 6, further comprising:
   second transmitting means for transmitting, to the display device, attribute information concerning an attribute indicative of whether imaginary light from the light source position can effectively reach each of a second plurality of areas into which each of the remaining reflecting basic surfaces is divided on the basis of the design information.

8. The evaluation system according to claim 6, wherein the first plurality of areas into which a first reflecting basic surface is divided are equally sized and repetitively arranged.

9. The evaluation system according to claim 6, wherein the plurality of reflecting basic surfaces are non-continuous.

10. A computer-readable storage medium storing a program to be executed by a computer, the program enabling the computer to evaluate reflection performance of a reflecting mirror designed for a vehicle lamp, wherein the program includes:
   an input process for entering design information and position information of a light source position in the vehicle lamp, the design information being indicative of a plurality of reflecting basic surfaces, the plurality of reflecting basic surfaces constituting the reflecting mirror; and
   a first display process for displaying attribute information concerning an attribute indicative of whether imaginary light from the light source position can effectively reach each of a first plurality of areas into which a first reflecting basic surface, selected from among the plurality of reflecting basic surfaces, is divided on the basis of the design information;
   wherein the plurality of reflecting basic surfaces are discrete surfaces;
   wherein the program further includes:
      a first division process for generating divided area information, the divided area information including area data on the first plurality of areas of the first reflecting basic surface selected from among the reflecting basic surfaces, the divided area information being associated with the design information;
      a first determination process for making a determination, on the basis of the divided area information and the design information, as to whether the imaginary light from the light source position can effectively reach each of the first plurality of areas of the first reflecting basic surface; and
      a first attribute process for generating the attribute information for each of the first plurality of areas on the basis of the determination, the attribute information being associated with at least one of the design information and the divided area information;
   wherein the first determination process makes the determination as to whether the imaginary light from the light source position can effectively reach each of the first plurality of areas by:

providing an evaluation point within each of the first plurality of areas;
generating a straight line, the straight line connecting the evaluation point to the light source position; and
determining whether the straight line intersects another reflecting basic surface other than the first reflecting basic surface which is associated with the first plurality of areas.

11. The storage medium according to claim 10, wherein the program further comprises:
   a second process for displaying attribute information concerning an attribute indicative of whether imaginary light from the light source position can effectively reach each of a second plurality of areas into which each of the remaining reflecting basic surfaces is divided on the basis of the design information.

12. The storage medium according to claim 10, wherein the program further includes:
   a division process provided so as to generate divided area information, the divided area information including area data on a second plurality of areas; into which each of the reflecting basic surfaces is divided on the basis of the design information, the divided area information being associated with the design information;
   a determination process provided so as to make a determination, on the basis of the divided area information and the design information, as to whether imaginary light from the light source position can effectively reach of the second plurality of areas of each of the reflecting basic surfaces;
   an attribute process provided so as to generate, on the basis of the determination, the attribute information for each of the second plurality of areas of each reflecting basic surface, the attribute information being associated with at least one of the design information and the divided area information; and
   another display process provided so as to display the attribute information for each of the second plurality of areas into which each of the remaining reflecting basic surfaces is divided on the basis of the design information.

13. The storage medium according to claim 10, wherein the first plurality of areas into which a first reflecting basic surface is divided are equally sized and repetitively arranged.

14. The storage medium according to claim 10, wherein the plurality of reflecting basic surfaces are non-continuous.

* * * * *